United States Patent [19]
Uhl

[11] Patent Number: 5,926,961
[45] Date of Patent: Jul. 27, 1999

[54] TREE TRIMMER WITH TELESCOPIC ROD

[75] Inventor: Klaus-Martin Uhl, Baltmannsweiler, Germany

[73] Assignee: Andreas Stihl AG & Co., Waiblingen, Germany

[21] Appl. No.: 08/850,627

[22] Filed: May 2, 1997

[30] Foreign Application Priority Data

May 4, 1996 [DE] Germany ............................ 196 18 024

[51] Int. Cl.⁶ ............................ B27B 17/02; F16C 3/035; A01G 3/08; F16B 7/14
[52] U.S. Cl. ........................ 30/296.1; 30/166.3; 30/312; 30/383; 30/517; 403/109.1; 403/351; 403/377; 403/311; 464/162; 464/172
[58] Field of Search ..................... 30/383, 276, 296.1, 30/312, 272.1, 275.4, 166.3, 517, 122; 464/52, 162, 172, 177, 170, 179; 403/109.1, 26, 350, 351, 352, 373, 377, 309, 311; 248/401, 410, 414

[56] References Cited

U.S. PATENT DOCUMENTS

| | | | |
|---|---|---|---|
| 4,505,040 | 3/1985 | Everts | 30/296.1 |
| 4,574,481 | 3/1986 | Ericsson | 30/296.1 |
| 4,654,971 | 4/1987 | Fettes et al. | 30/383 |
| 4,733,471 | 3/1988 | Rahe | 30/276 |
| 4,899,446 | 2/1990 | Akiba et al. | 30/276 |
| 4,991,298 | 2/1991 | Matre | 30/296.1 X |
| 5,013,282 | 5/1991 | Keller | 464/172 |

FOREIGN PATENT DOCUMENTS

3213185 10/1983 Germany.

*Primary Examiner*—Rinaldi I. Rada
*Assistant Examiner*—Boyer Ashley
*Attorney, Agent, or Firm*—Robert W. Becker & Associates

[57] ABSTRACT

A hand-guided working tool has a telescopic rod with a first and a second end. A drive motor is connected to the first end of the telescopic rod. A working tool, connected to the second end of the telescopic rod, is driven by the drive motor. The telescopic rod includes an outer tube and an inner tube inserted with an inner end into the outer tube and displacable in the longitudinal direction of the telescopic rod. A first clamping member is connected to the first end of the outer tube for fixing the axial position of the inner tube. The inner tube has an outer mantle surface and the outer tube has an inner circumferential surface. The outer mantle surface is spaced at a radial distance from the inner circumferential surface. A first cylindrical bearing body is supported on the inner end of the inner tube. The first bearing body is displacably supported in the outer tube. The first clamping member has an inner circumferential guide surface matching the outer mantle surface of the inner tube such that the inner tube is secured coaxially relative to the outer tube by the first clamping member and the first bearing body.

23 Claims, 7 Drawing Sheets

TREE TRIMMER WITH TELESCOPIC ROD

BACKGROUND OF THE INVENTION

The present invention relates to a hand-guided working tool, especially a trimmer for trimming trees, comprised of a drive motor connected to one end of a telescopic rod and a working tool connected to the other end of the telescopic rod and driven by the drive motor, whereby the telescopic rod is comprised of an outer tube and an inner tube longitudinally displaceably guided in the outer tube whereby the inner tube is secured in its axial position by a clamping member provided at the outer tube.

Such a working tool is known from German Patent Application 32 13 185. It is comprised substantially of a telescopic rod having connected to a first end thereof a drive motor and to the other end a working tool whereby the working tool is driven by the drive motor via a drive shaft positioned within the telescopic rod. The telescopic rod is comprised of an inner tube and an outer tube whereby the inner tube is longitudinally displaceably guided in the outer tube and whereby the inner tube has an outer diameter corresponding to the inner diameter of the outer tube. Thus, the inner tube over the entire insertion length is supported at the inner circumference of the outer tube so that a load resistant material, for example, tubes of steel, must be used. The resulting great weight of the device limits the possible working length and also causes the operator to quickly become fatigued. A soiling of the gliding surface results in impeded displacability or even in blocking of the telescopic rod.

It is therefore an object of the present invention to improve the aforementioned working tool such that the telescopic rod with constructively simple and light-weight design ensures a reliable function over an extended period of time.

SUMMARY OF THE INVENTION

A hand-guided working tool according to the present invention is primarily characterized by:

A telescopic rod having a first and a second end;

A drive motor connected to the first end of the telescopic rod;

A working tool connected to the second end of the telescopic rod and driven by the drive motor;

The telescopic rod comprised of an outer tube and an inner tube inserted with an inner end into a first end of the outer tube and displacable in a longitudinal direction of the telescopic rod;

A first clamping member connected to the first end of the outer tube for fixing an axial position of the inner tube;

The inner tube having an outer mantle surface and the outer tube having an inner circumferential surface;

The outer mantle surface being spaced at a radial distance from the inner circumferential surface;

A first cylindrical bearing body supported on the inner end of the inner tube;

The first bearing body displacably supported in the outer tube;

The first clamping member having an inner circumferential guide surface matching the outer mantle surface of the inner tube such that the inner tube is secured coaxially relative to the outer tube by the first clamping member and the first bearing body.

The working tool preferably further comprises a second clamping member, a connecting tube, and a second cylindrical bearing body. The outer tube has a second end opposite the first end. The second clamping member is connected to the second end of the outer tube. The connecting tube is inserted with a first end into the second end of the outer tube and has an outer mantle surface. The second clamping member has an inner circumferential guide surface matching the outer mantle surface of the connecting tube. The second bearing body is supported on the first end of the connecting tube and is supported in the outer tube.

Advantageously, the connecting tube and the inner tube have an identical outer diameter.

The first and second clamping members are identical.

The clamping members are comprised of a fastening sleeve engaging the outer tube and a clamping sleeve having provided thereat the inner circumferential guide surface.

The inner circumferential guide surface preferably extends essentially parallel to the outer mantle surface of the inner tube and of the connecting tube, respectively, and is comprised of axial stays circumferentially spaced from one another.

The inner circumferential guide surface comprises an annular portion at an end of the clamping sleeve remote from the fastening sleeve wherein the axial stays are connected to the annular portion.

The clamping sleeve has an outer diameter that increases continuously from the annular portion toward the fastening sleeve and the clamping sleeve has an outer mantle surface provided with axial grooves spaced in the circumferential direction, wherein the axial grooves are radially aligned with the axial stays.

The clamping sleeve and the fastening sleeve form a unitary slotted sleeve member having a circumferential slot, separating the clamping sleeve and the fastening sleeve and extending over an angular distance of more than 120°.

The angular distance is 225°.

Preferably, the slotted sleeve member has a circumferential groove for receiving a sealing ring and the circumferential slot extends in the circumferential groove.

The circumferential slot extends in a plan that extends perpendicularly to the longitudinal axis of the clamping member.

The slotted sleeve member has a longitudinal slot extending parallel to the longitudinal axis over an entire length of the slotted sleeve member, wherein the longitudinal slot has opposed slot edges and wherein in an inner transition area between the clamping sleeve and the fastening sleeve a circumferentially extending closure tab is connected to one of the opposed slot edges for covering the longitudinal slot in the inner transition area.

Preferably, the first bearing body is a first bearing sleeve surrounding the inner end of the inner tube and being fastened thereto. The second bearing body is a second bearing sleeve surrounding the first end of the connecting tube and fastened thereto.

The first and second bearing sleeves are non-rotatably supported in the outer tube.

Each one of the bearing sleeves is secured at the outer tube by at least one axially extending tongue-and-groove arrangement comprised of a longitudinally extending guide tongue and a matching longitudinally extending guide groove.

The guide tongue is connected to the outer tube and extends in the longitudinal direction of the telescopic rod over the entire length of the outer tube. The guide groove is provided at the outer mantle surface of the bearing sleeve and has open ends.

The working tool may further comprise a first inner bearing position inside the first bearing body and a second inner bearing positioned inside the second bearing body. A telescopic drive shaft for drivingly connecting the drive motor to the working tool is provided. The telescopic drive shaft is rotatingly supported by the first and second inner bearings.

Advantageously, the first and second inner bearings are roller bearings.

The working tool may also comprise a first and a second rotary follower axially fixedly secured in an inner ring of the first and second inner bearings. The telescopic drive shaft comprises a shaft rod extending through the first and second rotary followers.

The first and second rotary followers consist of plastic material.

The inner tube and the outer tube preferably consist of aluminum or an aluminum alloy and the bearing bodies consist of plastic material.

The working tool may also comprise a plastic hose enclosing the outer tube between the first and second clamping members, the plastic hose having an outer profiling.

The outer tube may be embodied as a grip rod.

The glide surface provided for guiding the inner tube of the telescopic rod is limited to the axial length of the bearing bodies. This improves the easy displaceability of the inner tube within the outer tube. The outer mantle surfaces of the inner tube and the inner circumferential surface of the outer tube are spaced at a distance to one another so that between them an annular chamber is formed. A direct gliding contact between the inner tube and the outer tube is thus prevented, so that, for example, aluminum, respectively, aluminum alloys can be used for the telescopic rod. This reduces the weight of the working tool substantially and thus increases the possible operating length of the telescopic rod without limiting or impeding the manipulation of the tool. Even for an extended operating time, the operator can still guide the working tool with only minimal fatigue.

In a further embodiment of the invention, the end of the outer tube facing away from the inner tube is provided with a further clamping member the guide surface of which matches the outer mantle surface of the connecting tube engaging the outer tube. The inner end of the connecting tube supports a cylindrical bearing body which is secured at the outer tube. Expediently, the connecting tube and the inner tube have the same outer diameter so that the clamping member provided at the end of the outer tube can have the same design as the first clamping member. By providing identical parts, a constructively simple design and thus an inexpensive manufacture of the telescopic rod result. By using a connecting tube between the drive motor and the outer tube of the telescopic rod, it is possible to use the drive unit of conventional trimmers (weed trimmers etc.). For this purpose, the connecting tube and the inner tube are provided with the same diameter as the guide tube of the conventional trimmers. Accordingly, a conventional trimmer can be changed into a tree trimmer by arranging the inventive telescopic rod thereto without requiring any changes in the drive unit of the trimmer.

When at the end of the clamping sleeve facing away from the fastening sleeve an annular portion is provided at the end of the guide surface, the clamping sleeve surrounds the outer mantle surface of the inner tube, respectively, of the connecting tube in a substantially dust-tight manner so that the introduction of dust into the telescopic rod is substantially prevented.

In order to prevent the introduction of dirt especially in the area of the diameter step within the clamping member, a closure tab is provided in the area of the inner transition portion from the fastening sleeve to the clamping sleeve. The closure tab extends in the circumferential direction and is formed at one longitudinal edge of the longitudinal slot. It thus covers the longitudinal slot in the area of the inner transition portion.

In order to ensure a non-rotatable arrangement of the working tool and the drive motor relative to one another, it is suggested to secure the bearing bodies within the outer tube in a non-rotatable manner. In this manner, a rotationally fixed arrangement is achieved even when it is necessary to release the clamping sleeve from the inner tube for extending or shortening telescopic rod.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiment utilizing FIGS. 1 through 14.

Figure 1:
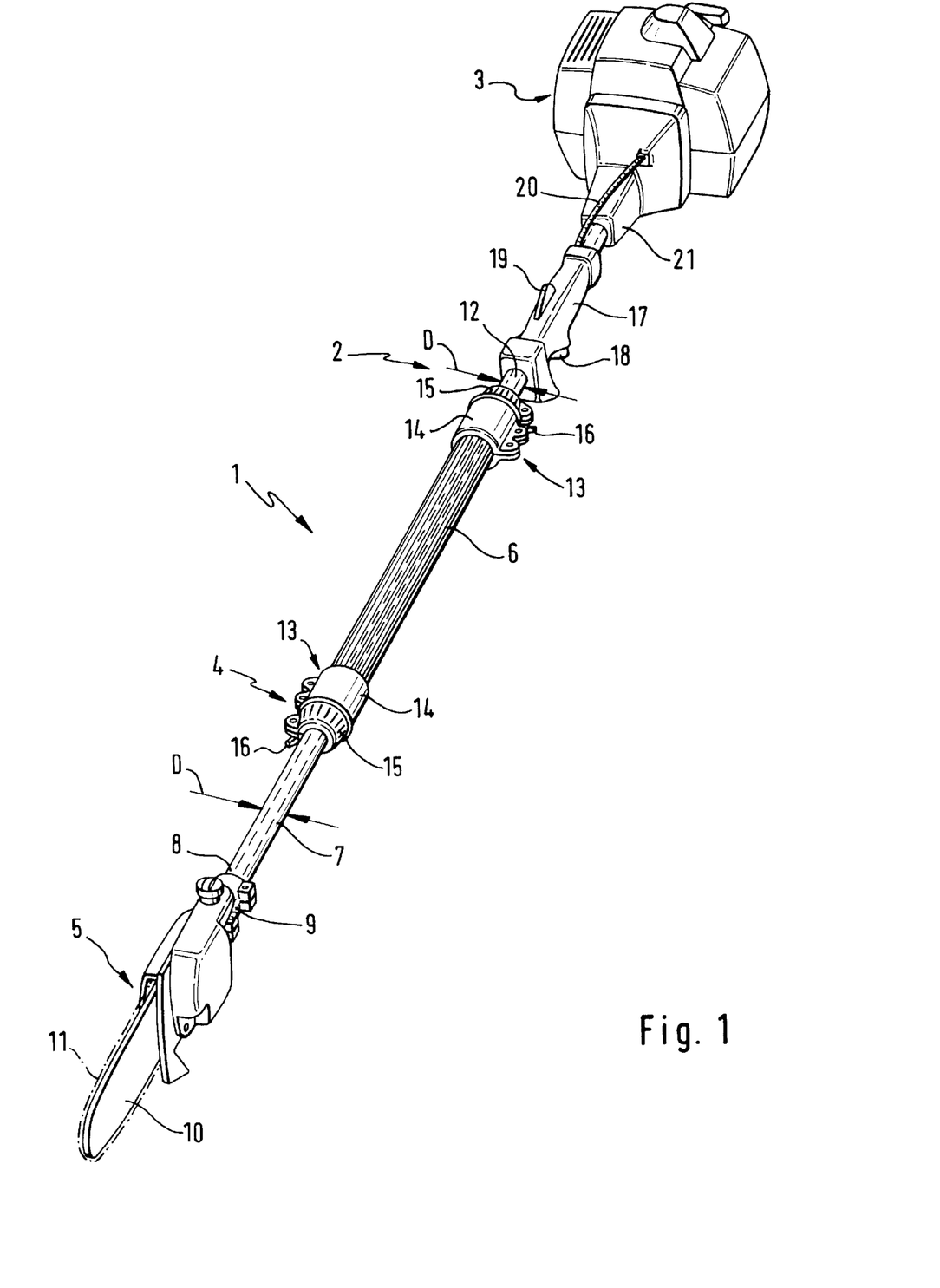
FIG. 1 is a perspective representation of a hand-guided working tool for trimming limbs and branches of trees etc.

The hand-guided working tool represented in FIG. 1 serves for trimming trees (thinning, cutting branches) etc. The working tool is comprised of a telescopic rod 1 that at one end 2 has connected thereto the drive motor 3 and at the other end 4 has connected thereto the working tool 5. The telescopic rod 1 is comprised of an outer tube 6 and an inner tube 7 guided longitudinally displacably in the outer tube 6. The free end 8 of the inner tube 7 supports a gear housing 9 with a bevel gear arrangement via which the saw chain 11 guided on a guide rail 10 is driven.

A connecting tube 12 extends into the end 2 of the outer tube 6 which is facing away from the inner tube 7. It is secured within the outer tube 6. At the two ends 2 and 4 of the outer tube 6 a respective clamping member 13 is arranged which is secured with a fastening sleeve 14 on the respective end 2, 4 of the outer tube 6. Adjacent to the fastening sleeve 14 a clamping sleeve 15 is provided which matches the outer diameter of the inserted inner tube 7, respectively, the inserted connecting tube 12. The clamping sleeve 15 is securable with a clamping screw 16 on the inserted tube 7, respectively, 12.

The connecting tube 12 is arranged between the outer tube 6 and the drive motor 3 and supports an operator handle 17 at which are arranged a throttle lever 18 and a throttle lever lock 19. The throttle lever 18 is connected with a Bowden cable 20 to a control element for operating the drive motor 3. In the shown embodiment, the drive motor is an internal combustion engine, especially a two-stroke internal combustion engine. The control member actuated by the Bowden cable 20 is the throttle valve of the carburetor via which the drive motor is provided with the air-fuel mixture.

For achieving a simple construction with conventional tubes the connecting tube 12 and the inner tube 7 have the same diameter, especially the same outer diameter D. This makes it possible to use as a drive motor 3 for the inventive device a conventional (weed) trimmer motor. The connector 21 at the motor housing can remain unchanged when the connecting tube 12 corresponds to the diameter of the guide tube conventionally used with trimmers. The connecting tube 12 allows for a simple and expedient connection to the telescopic rod 1. The required clamping members 13 on the ends of the outer tube 6 are of identical construction because the connecting tube 12 and the inner tube 7 have the same outer diameter D.

Figure 2:
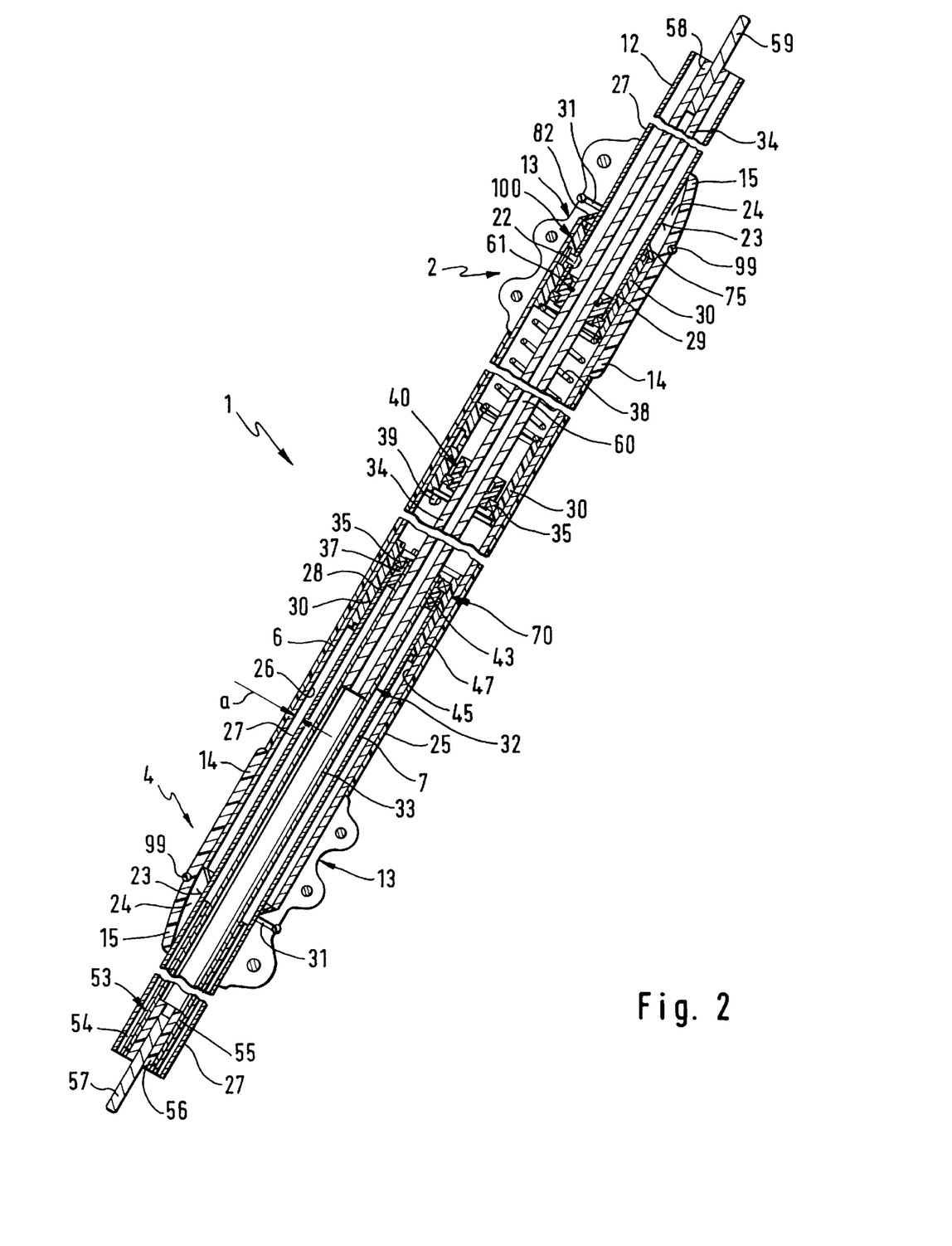
FIG. 2 is a longitudinal section of the telescopic rod of the working tool of FIG. 1.

In the longitudinal section shown in FIG. 2 the detailed design of the telescopic rod 1 is shown. The outer mantle surface 27 of the inner tube 7 is positioned at a radial distance a to the inner circumferential surface 26 of the outer tube 6. The inner end 28 of the inner tube 7 is secured at a bearing body or bearing sleeve 30. The inner end 28 of the inner tube 7 projects into the bearing sleeve 30. Preferably, the bearing body or sleeve 30 is connected to the inner end 28, especially riveted thereto. The bearing sleeve 30 forms a slide bearing 70 which can be displaced in the longitudinal direction of the outer tube 6.

In the same manner, the end 29 of the connecting tube 12 is introduced and secured in the outer tube 6. The bearing body or bearing sleeve 30 engages the end 29 and is secured at the connecting tube 12, especially with a rivet 22, in a positive-locking manner. The bearing sleeve 30 is non-slidably secured within the outer tube 6 and thus provides an axially fixed bearing 100 for the connecting tube 12.

At the two ends 2 and 4 of the connecting tube 6 the fastening sleeve 14 of the clamping member 13 is frictionally connected. A positive-locking connection on the outer tube 6 can also be expedient. Between the two clamping members 13 the outer tube 6 is enclosed by a hose, especially a profiled hose 25, having profilings in the longitudinal direction the outer tube 6. The outer tube 6 is thus provided with increased grip so that it can be used as a grip rod.

The clamping members 13 engage with their clamping sleeves 15 the tubes 7 and 12 inserted therein whereby the clamping sleeve 15 has an inner circumferential guide surface 23 which rests at the outer mantle surface 27 of the tubes 7 and 12. The guide surface 23 is partly formed by axial stays 24 which extends substantially over the length of the clamping sleeve 15 and, in the circumferential direction, are positioned at a distance to one another. The fastening sleeve 14 and the clamping sleeve 15 form a one-part slotted sleeve member whereby the clamping sleeve 15 is separated from the fastening sleeve 14 by a circumferential slot 31 which extends over a circumferential distance of less than 300°, especially 225°.

Figure 4:
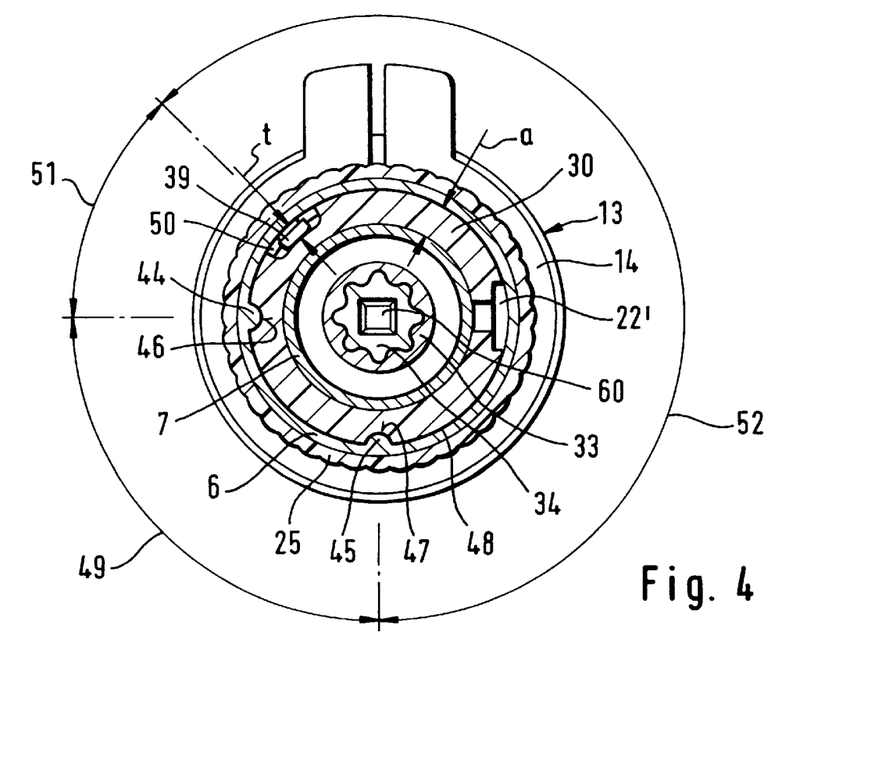
FIG. 4 shows a section along the line IV—IV of FIG. 3.

The drive connection between the drive motor 3 and the working tool 5 is provided in the form of a telescopic drive shaft 32 which consists of a shaft tube 33 and a shaft rod 34. As shown in FIG. 4, the shaft tube 33 in the circumferential direction has a longitudinal profile with wave-shaped teeth (in cross-section) that is engaged by the matching outer profile of shaft rod 34 such that a rotationally fixed but longitudinally slidable connection is provided. Along the length of the outer tube 6 the telescopic drive shaft 32, especially its shaft tube 34, is rotatably supported within the bearing sleeves 30. For this purpose, in the bearing sleeves 30 an inner bearing, especially a roller bearing 35, is provided whereby a rotary follower 37 is frictionally secured in the inner ring 36. The rotary follower 37 has a cross-sectional shape that matches the profile of the shaft rod 34 and is slipped onto the shaft rod 34 so as to be axially displaceable. The shaft rod 34 is thus rotatably supported by the rotary follower 37 and the roller bearing 35 within the bearing body (sleeve) 30 which, as will be disclosed in the following, is rotationally fixedly secured within the outer tube 6.

Between the bearing sleeve 30 of the axially fixed bearing 100 of the connecting tube 12 at the end 2 of the outer tube 6 and the bearing sleeve 30 of the slide bearing 70, an intermediate bearing 40 is arranged which is comprised of a bearing sleeve 30 that is axially displaceably guided but rotationally fixedly positioned in the outer tube 6. In the bearing sleeve 30, like in the other bearing sleeves, an inner bearing in the form of a roller bearing 35 is provided that has a rotary follower 37 displacably guided on the shaft rod 34. The intermediate bearing 40 is biased by a coil spring 38 in the direction toward the slide bearing 70 whereby the coil spring 38 is supported at the bearing sleeve 30 of the bearing 100 positioned at the connecting tube 12. The displacement stroke of the intermediate bearing 40 is limited by an axial abutment 39 which projects radially into the interior of the outer tube 6. In the end position determined by the abutment 39 the intermediate bearing 40 rests under spring force at the abutment 39.

Figure 3:
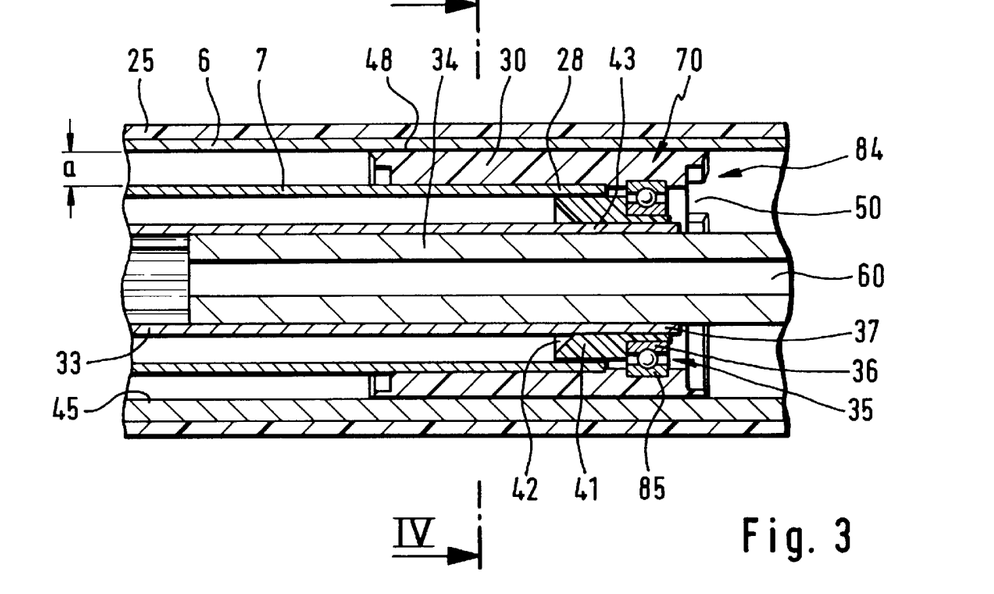
FIG. 3 is an enlarged representation of a longitudinal section of the end portion of the inner tube guided by a bearing body within the outer tube of the telescopic rod.

As can be seen especially in FIGS. 3 and 4, the shaft tube 33, positioned within the inner tube 7 with its end 43 facing the shaft rod 34, is supported within the rotary follower 37 for which purpose the rotary follower 37 comprises a sleeve projection 41 that engages especially frictionally the end 43 of the shaft tube 33. The sleeve projection 41 has an insertion cone 42. The end 43 is thus, on the one hand, centered within the telescopic rod 1 and, on the other hand, rotatably supported via the rotary follower 37 at the roller bearing 35.

The bearing sleeves 30 are rotationally fixedly positioned within the outer tube 6. For this purpose, over the entire length of the outer tube 6, at least one tongue-and-groove arrangement is provided, including at least one axial guide tongue 44, 45 which engages a matching guide groove 46, 47. In the shown embodiment, at the inner circumferential surface 26 of the outer tube 6, two guide tongues 44 and 45 are arranged which, in the circumferential direction, are positioned relative to one another at an angular distance 49 of preferably 90°. In the corresponding angular position 49 guide grooves 46 and 47 are formed at the outer mantle surface 48 of the bearing body. The guide grooves 46, 47 are open at the end faces of the bearing body. The guide groove 46 has positioned adjacent thereto an axially open free groove 50 of the radial depth t. The depth t is greater than the radially projecting height of the axial abutment 39. The free groove 50 is spaced relative to the guide groove 46 at an angular distance 51. The angular distance 52 relative to the guide groove 47 at the other side is greater than the angular distance 51. The greater angular distance 52 is 225°. Opposite the guide groove 46, a rivet opening 22' for receiving a rivet is arranged at the wall of the bearing sleeve 30 (compare rivet 22 in FIG. 2).

The axial abutment 39 is positioned adjacent to the guide tongue 44 at an angular distance 51 of preferably 45°. In the mounted position shown in FIG. 4, the free groove 50 and the axial abutment 39 are positioned, viewed in the longitudinal direction of the outer tube 6, so as to be congruent (aligned) so that, when retracting the telescopic rod 1, the bearing sleeve 30 of the inner tube 7 can pass the axial abutment 39. The intermediate bearing 40 is then displaced counter to the force of the coil spring 38 toward the connecting tube 12. As shown in FIG. 1, the bearing sleeve 30 of the intermediate bearing 40 is secured within the outer tube 6 in a position rotated by 180° so that the free groove 50 of the guide tongue 45 is positioned at an angular distance of 45° thereto. The axial abutment 39 and the free groove 50 are not congruent in the displacement direction of the intermediate bearing 40 so that it is impossible for the bearing sleeve 30 of the intermediate bearing 40 to pass the axial abutment 39. The bearing sleeve 30 of the intermediate bearing 40 thus contacts the abutment 39. The axial displacement of the intermediate bearing 40 is limited accordingly.

The shaft tube 33 of the telescopic drive shaft 32 is supported in the inner tube 7 of the telescopic rod 1 by an elongate bearing 53. The bearing 53 is comprised of a plastic hose, a so-called liner. The tube shaft 33 is rotatably supported in the liner. The liner itself is radially secured with axial stays 54 of a short radial length within the inner tube 7. Preferably, it is rigidly supported.

Into the end 55 of the shaft tube 33, positioned at the open end of the inner tube 7, an adapter piece 56 is rotatably fixedly inserted which adapter piece 56 is comprised of plastic. It supports a square member 57 as a coupling piece to the bevel gear arrangement. It may be expedient to provide a cut-to-length section of the shaft rod 34 as an adapter piece whereby the square member 57 is press-fit into the shaft section. The end 58 of the shaft rod 34 facing the drive motor 3 supports a corresponding square member 59 for connection to the drive motor 3. The square member 59 is coaxially positioned within a through channel 60 of the shaft rod 34. For axially securing the shaft rod 34, a spring ring 61 is provided which is resting at the side of the rotary follower 37 facing the connecting tube 12 and positioned within the bearing sleeve 30 axially fixed (rivetted) to the connecting tube 12. The axial securing of the shaft tube 33 is ensured by its axial support within the rotary follower 37 that is secured at the bearing sleeve 30 connected to the end 28 of the inner tube 7.

The bearing sleeves 30 as well as the inner bearings 35 and the rotary followers 37 of all combination bearings 40, 70, 100 are identical parts, i.e., they can be exchanged freely between bearings.

Figures 5, 6:
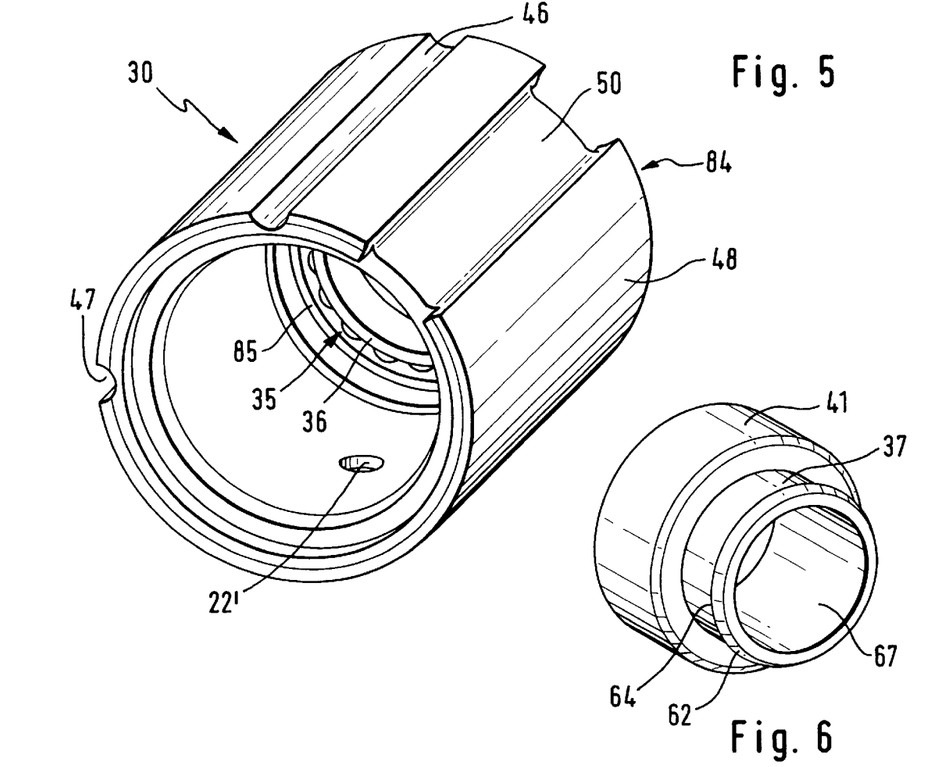
FIG. 5 is a perspective representation of a bearing body arranged within the outer tube.
FIG. 6 is a perspective representation of a rotary follower arranged within the bearing body of FIG. 5.

The bearing body 30 is perspectively shown in FIG. 5. At its outer mantle surface 48 the guide grooves 46 and 47, open at their end faces, as well as the free groove 50, also open at its end faces, are shown. The guide grooves 46 and 47 extend in the longitudinal direction and are part-circular in cross-section. Accordingly, the guide tongues 44, 45 are also part-circular, as can be seen in FIG. 4. The rivet opening 22' for the fastening rivet 22 (FIG. 2) is provided diametrically opposite the guide groove 46 whereby the rivet opening 22' is arranged approximately at half the axial length of the bearing member 30. At the end 84 of the bearing body 30 the inner bearing in the form of a roller bearing 35 is provided whereby its outer ring 85 (FIG. 3) is preferably injection-molded into the bearing body (sleeve) 30. The bearing body 30 is comprised of plastic material.

The rotary follower 37 according to FIG. 6 is snapped into the inner ring 36 of the roller bearing 35 whereby, for facilitating introduction of the rotary follower 37, a bevel 62 is provided at the follower end to be inserted. The bevel 62 has a raised inner rim 64 so that the inner ring 36 is axially fixedly secured between the sleeve projection 41 and the raised rim 64 of the bevel 62, as shown in FIG. 3. The through opening 67 of the rotary follower 37 has a longitudinal profile that matches the cross-sectional shape of the shaft rod 34 so that the shaft rod 34 is rotationally fixed but displaceably secured in the longitudinal profile of the through opening 67 of the rotary follower 37.

Figure 7:
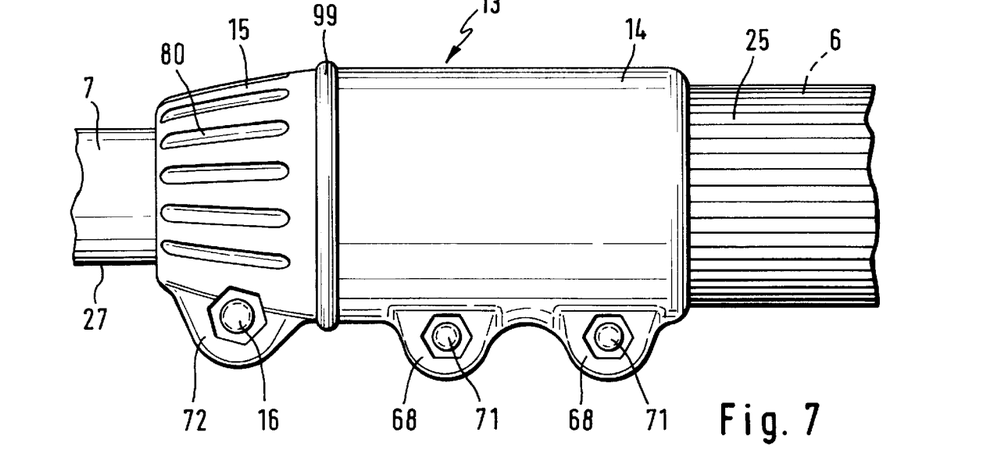
FIG. 7 is an enlarged representation of a clamping member provided at the end of the outer tube.

The inner end 28 of the inner tube 7 of the telescopic rod 1 is secured by the slide bearing 70 (FIG. 3). The inner tube 7 is also secured at the end 4 of the outer tube 6 by the guide surfaces 23 of the clamping member 13. As shown in FIG. 7, the fastening sleeve 14 is secured by the clamping screws 71 so that it cannot be lost to the end of the outer tube 6, whereby the protective hose 25 is missing in the clamping area.

Figure 8:
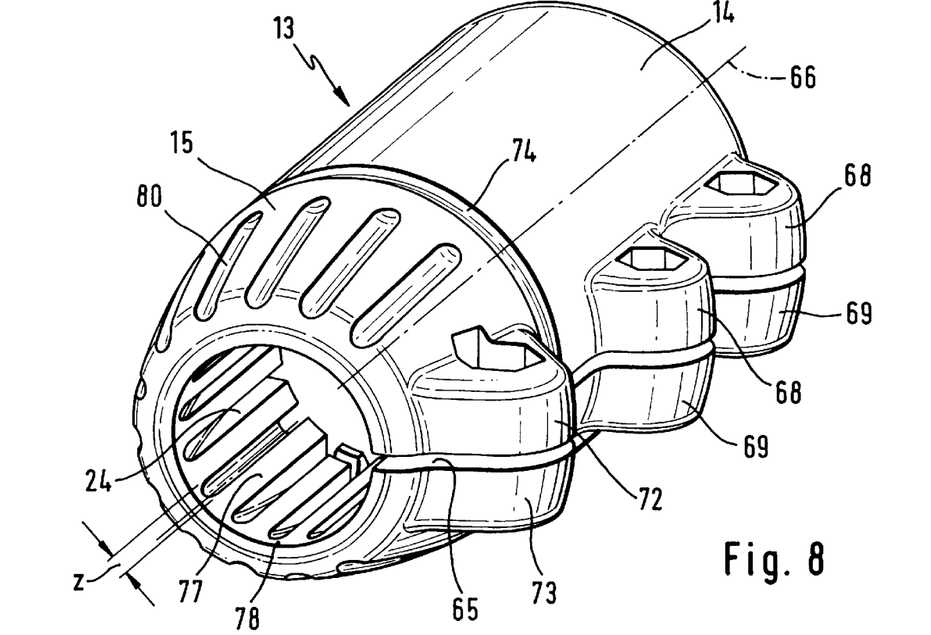
FIG. 8 is a perspective representation of the clamping member according to FIG. 7.
Figure 9:
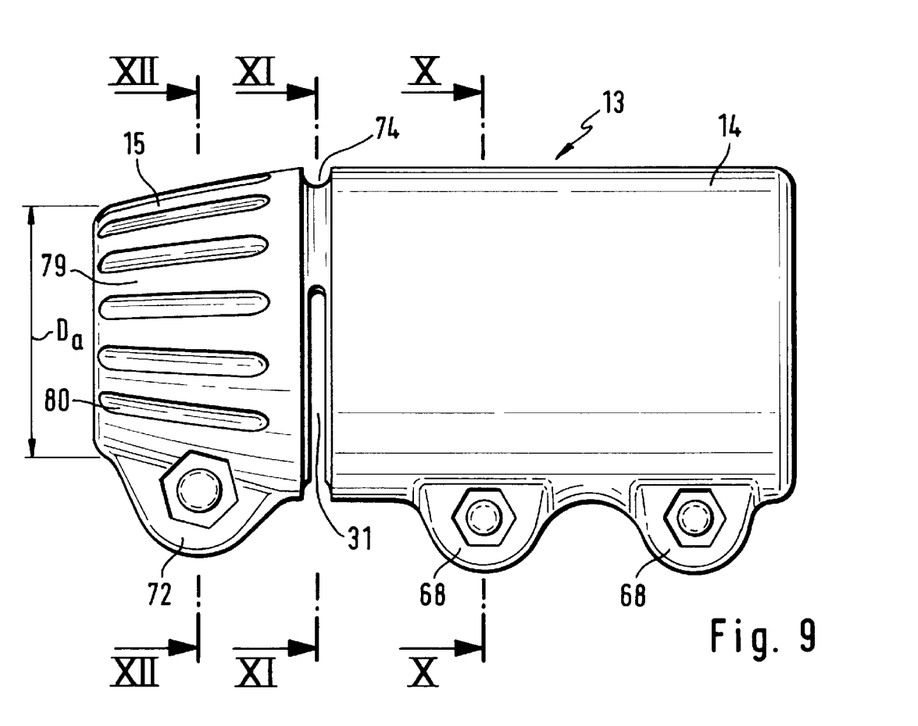
FIG. 9 is a sideview of the clamping member of FIG. 8.

As can be seen in the perspective representation according to FIG. 8, the fastening sleeve 14 as well as the clamping sleeve 15 are embodied as a unitary part in the form of a slotted sleeve member. They are preferably made of plastic material. The longitudinal slot 65 within the sleeve member extends straight over its length parallel to the longitudinal center axis 66 of the clamping member 13. In the area of the fastening sleeve 14 at both sides of the slots 65 two clamping ears 68, 69 are arranged in which the clamping screws 71 projecting transversely through the longitudinal slot 65 are secured. In the same manner, a respective clamping ear 72, 73 is arranged in the end section of the longitudinal slot 65 extending within the clamping sleeve 15. They secure the clamping screws 16 bridging the longitudinal slot 65. The clamping screw 16 is preferably a tommy screw which can by tightened or loosened by the operator without tools.

The circumferential slot 31 which separates the clamping sleeve 15 from the fastening sleeve 14 over a large portion of the circumference is provided within an outer circumferential groove 74 of the clamping member 13. The circumferential groove 74 is arranged within the clamping sleeve 15 on a remote side of a transition section 75 which is provided between the clamping sleeve 15 and the fastening sleeve 14 for bridging the distance a. The circumferential slot 31 defines a plane that extends perpendicularly to the longitudinal center axis 66 of the bearing body 30.

Figure 11:
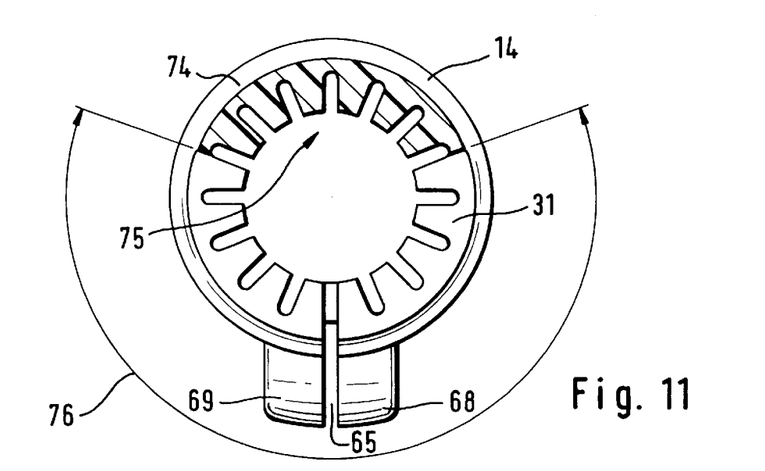
FIG. 11 is a section along the line XI—XI in FIG. 9.

As can be seen in the cross-sectional representation of FIG. 11, the circumferential slot 31 extends over a circumferential angle 76 of more than 90°. In the shown embodiment the circumferential angle 76 is 220°.

For preventing contamination within the clamping member 13, the circumferential groove 74 has inserted therein a sealing ring 99 (FIG. 2, FIG. 7) which is preferably an O-ring. The sealing ring 99 thus closes off the circumferential slot 31 over the entire circumference of the clamping member 13 whereby the sealing ring 99 crosses the longitudinal slot 65.

Figure 10:
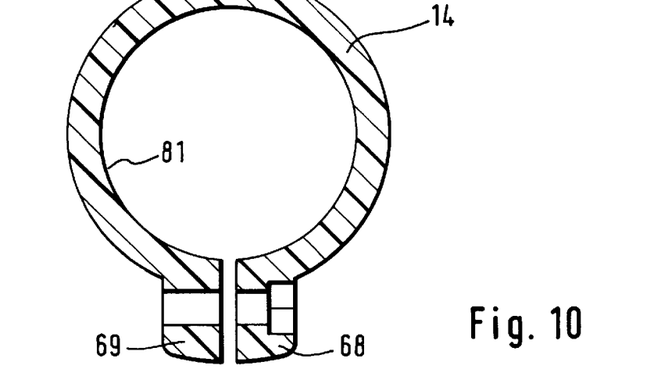
FIG. 10 is a section along the line X—X of FIG. 9.
Figure 12:
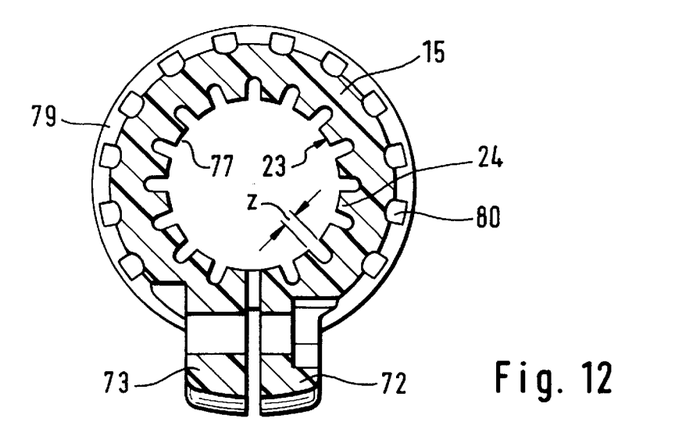
FIG. 12 is a section along the line XII—XII in FIG. 9.

As can be seen in the cross-sectional views of FIGS. 10 through 12, in the area of the inner transition portion 75 and in the area of the clamping sleeve 15 axial stays 24 are arranged. Their the stay surfaces 77 face the longitudinal axis 66 and form the guide surface 23 of the clamping sleeve 15. At their ends facing away from the fastening sleeve 14 the stay surfaces 77 have a transition into an annular portion 78 which is provided at the inner circumference of the clamping sleeve 15. With the annular portion 78 it is ensured that the guide surface 23 surrounds substantially in a dust-tight manner the outer mantle surface 27 of the inserted tube 7, respectively, 12. The axial stays 24 are positioned at a lateral distance z (FIG. 8, 12) relative to one another.

The clamping sleeve 15 has an outer diameter $D_a$ that decreases in the direction toward its free end so that the clamping sleeve 15 has a truncated cone structure. At the free end of the clamping sleeve 15 open axial grooves 80 are provided within the outer mantle surface 79 of the clamping sleeve 15. Over the circumference the axial grooves 80 are positioned equidistantly relative to one another. Viewed in section according to FIG. 12, they are radially aligned with the stays 24. The axial grooves 80 in cross-section are part-circular.

The clamping member 13 is provided with a smooth inner wall 81. It may be expedient to provide the inner wall 81 with a rough surface structure in order to increase frictional connection forces.

Figure 13:
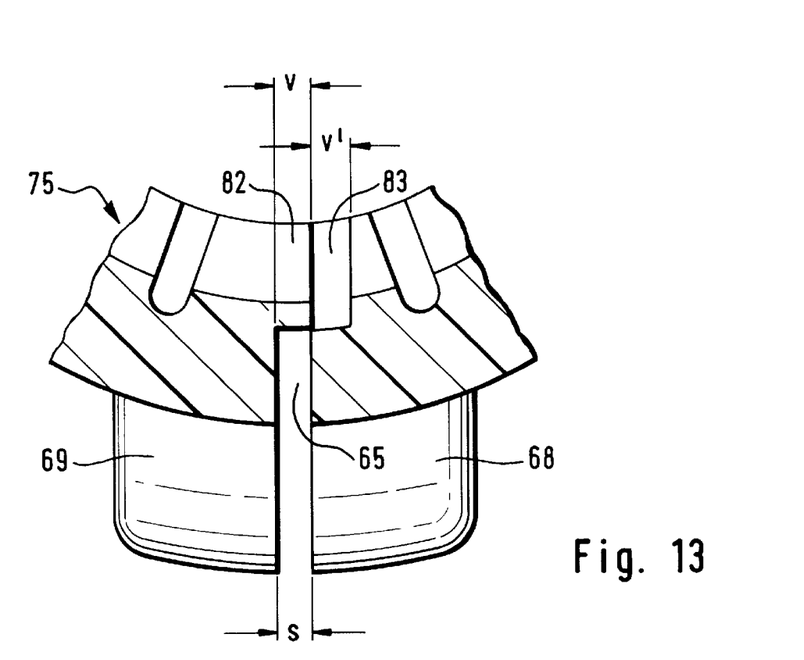
FIG. 13 is a part-sectional enlarged representation of the inner transition portion between the clamping sleeve and the fastening sleeve of the clamping member.
Figure 14:
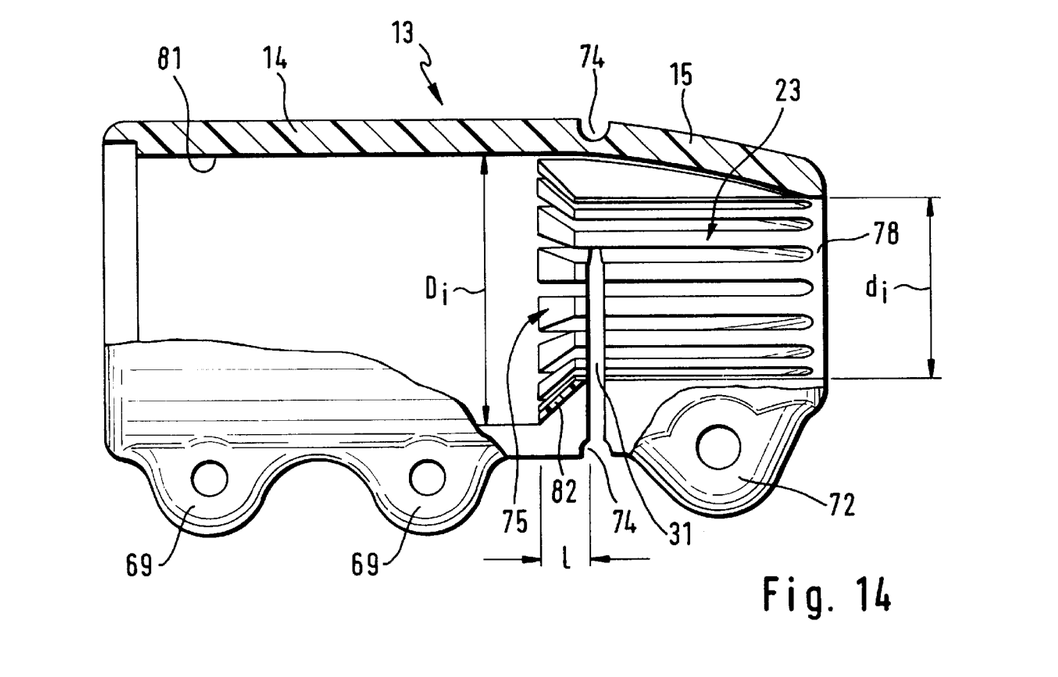
FIG. 14 is a longitudinal section of the clamping member according to FIG. 9.

As shown in FIG. 13, in the area of the inner transition portion 75 at the longitudinal edge of the longitudinal slot 65 separating the clamping member 13, a closure tab 82 is provided which extends over the axial length l (FIG. 14) of the inner transition portion 75 and furthermore extends from the inner diameter $D_i$ of the fastening sleeve 14 to the inner diameter $d_i$ of the guide surface 23 of the clamping sleeve 15. The closure tab 82 has, in the circumferential direction, an extension v which corresponds substantially to the width s of the longitudinal slot 65 measured in the circumferential direction in the unloaded state of the clamping member 13. The closure tab 82 extends into a receiving opening 83 in the opposite longitudinal edge of the longitudinal slot 65 so that upon clamping of the fastening sleeve 14, with the resulting reduction of width s of the longitudinal slot 65, the closure tab 82 will come to rest within the receiving opening 83. The width v' of the receiving opening 83 is slightly greater than the width v of the closure tab 82. The closure tab 82 thus closes the inner transition portion 75 over the entire circumference, also within the area of the longitudinal slot 65, so that the introduction of dirt into the intermediate annular space between outer tube 6 and inner tube 7 is substantially prevented.

The outer tube 6 and the inner tube 7 of the telescopic rod 1, preferably also of the shaft tube 33 and the shaft rod 34 of the telescopic drive shaft 32, are comprised of metal, preferably of aluminum or an aluminum alloy. The bearing body 30 of the combination bearings 40, 70, 100 are made of plastic material. Preferably, the inner bearings 35 are of the same construction and are injection-molded with their outer rings 85 into the bearing body 30. The rotary followers 37 to be snapped into the inner ring 36 of the roller bearing 35 are preferably comprised of plastic material and are of the same construction in all combination bearings 40, 70, 100.

The present invention is, of course, in no way restricted to the specific disclosure of the specification and drawings, but also encompasses any modifications within the scope of the appended claims.

What I claim is:

1. A hand-guided working tool comprising:

a telescopic rod having a first end and a second end;

a drive motor connected to said first end of said telescopic rod;

a working tool connected to said second end of said telescopic rod;

a telescopic drive shaft drivingly connecting said drive motor to said working tool and positioned inside said telescopic rod;

said telescopic rod comprised of an outer tube and an inner tube inserted with an inner end into a first end of said outer tube and displaceable in a longitudinal direction of said telescopic rod;

a first clamping member connected to said first end of said outer tube for fixing an axial position of said inner tube;

said inner tube having an outer mantle surface and said outer tube having an inner circumferential surface;

said outer mantle surface being spaced at a radial distance (a) from said inner circumferential surface;

a first cylindrical bearing body fastened to said outer mantle surface of said inner tube at said inner end;

said first cylindrical bearing body displaceably supported on said inner circumferential surface of said outer tube;

a first inner bearing positioned between said first cylindrical bearing body and said telescopic drive shaft to allow rotation of said drive shaft relative to said first cylindrical bearing body;

said first clamping member having an inner circumferential guide surface matching said outer mantle surface of said inner tube such that said inner tube is secured coaxially relative to said outer tube by said first clamping member and said first cylindrical bearing body;

a second clamping member, a connecting tube, and a second cylindrical bearing body, wherein said outer tube has a second end opposite said first end of said outer tube and said second clamping member is connected to said second end of said outer tube;

said connecting tube inserted with a first end into said second end of said outer tube and having an outer mantle surface;

said second clamping member having an inner circumferential guide surface matching said outer mantle surface of said connecting tube;

said second cylindrical bearing body supported on said outer mantle surface of said connecting tube at said first end of said connecting tube and supported on said inner circumferential surface of said outer tube.

2. A working tool according to claim 1, wherein said connecting tube and said inner tube have an identical outer diameter.

3. A working tool according to claim 1, wherein said inner tube and said outer tube consist of aluminum or an aluminum alloy and wherein said bearing bodies consist of plastic material.

4. A working tool according to claim 1, further comprising a plastic hose enclosing said outer tube between said first and second clamping members, said plastic hose having an outer profiling.

5. A working tool according to claim 1, wherein said outer tube is a grip rod.

6. A working tool according to claim 1, wherein said first and said second clamping members are identical.

7. A working tool according to claim 6, wherein said clamping members are comprised of a fastening sleeve engaging said outer tube and a clamping sleeve, wherein said inner circumferential guide surfaces are provided at said clamping sleeves.

8. A working tool according to claim 7, wherein said inner circumferential guide surfaces extend essentially parallel to said outer mantle surface of said inner tube and of said connecting tube, respectively, and are comprised of axial stays circumferentially spaced from one another.

9. A working tool according to claim 8, wherein each one of said inner circumferential guide surfaces comprises an annular portion at an end of said clamping sleeves remote from said fastening sleeves, wherein said axial stays are connected to said annular portions.

10. A working tool according to claim 9, wherein each one of said clamping sleeves have an outer diameter that increases continuously from said annular portions toward said fastening sleeves and wherein each one of said clamping sleeves have an outer mantle surface provided with axial grooves spaced in the circumferential direction, wherein said axial grooves are radially aligned with said axial stays.

11. A working tool according to claim 7, wherein each one of said clamping sleeves and said fastening sleeves form a unitary slotted sleeve member having a circumferential slot, separating said clamping sleeve and said fastening sleeve and extending over an angular distance of more than 120°.

12. A working tool according to claim 11, wherein said angular distance is 225°.

13. A working tool according to claim 11, wherein each one of said slotted sleeve members have a circumferential groove for receiving a sealing ring and wherein said circumferential slots extend in said circumferential grooves.

14. A working tool according to claim 11, wherein each one of said circumferential slots extend in a plane that extends perpendicularly to a longitudinal axis of said clamping members.

15. A working tool according to claim 14, wherein each one of said slotted sleeve members have a longitudinal slot extending parallel to said longitudinal axis over an entire length of said slotted sleeves, wherein each one of said longitudinal slots have opposed slot edges and wherein in an inner transition area between said clamping sleeves and said fastening sleeves circumferentially extending closure tabs are connected to one of said opposed slot edges for covering said longitudinal slots in said inner transition area.

16. A hand-guided working tool comprising:
a telescopic rod having a first end and a second end;
a drive motor connected to said first end of said telescopic rod;
a working tool connected to said second end of said telescopic rod and driven by said drive motor;
said telescopic rod comprised of an outer tube and an inner tube inserted with an inner end into a first end of said outer tube and displaceable in a longitudinal direction of said telescopic rod;
a first clamping member connected to said first end of said outer tube for fixing an axial position of said inner tube;
said inner tube having an outer mantle surface and said outer tube having an inner circumferential surface;
said outer mantle surface being spaced at a radial distance (a) from said inner circumferential surface;
a first cylindrical bearing body supported on said inner end of said inner tube;
said first cylindrical bearing body displaceably supported in said outer tube;

said first clamping member having an inner circumferential guide surface matching said outer mantle surface of said inner tube such that said inner tube is secured coaxially relative to said outer tube by said first clamping member and said first cylindrical bearing body;
said outer tube having a second end opposite said first end;
a second clamping member connected to said second end of said outer tube;
a connecting tube inserted with a first end into said second end of said outer tube and having an outer mantle surface;
said second clamping member having an inner circumferential guide surface matching said outer mantle surface of said connecting tube;
a second cylindrical bearing body supported on said first end of said connecting tube and supported in said outer tube;
wherein said first cylindrical bearing body is a first bearing sleeve surrounding said inner end of said inner tube and fastened thereto, and wherein said second cylindrical bearing body is a second bearing sleeve surrounding said first end of said connecting tube and fastened thereto.

17. A working tool according to claim 16, wherein said first and said second bearing sleeves are non-rotatably supported in said outer tube.

18. A working tool according to claim 17, wherein each one of said bearing sleeves is secured at said outer tube by at least one axially extending tongue-and-groove arrangement comprised of a longitudinally extending guide tongue and a matching longitudinally extending guide groove.

19. A working tool according to claim 18, wherein
each one of said guide tongues is connected to said outer tube and extends in said longitudinal direction of said telescopic rod over an entire length of said outer tube;
said guide grooves are provided at said outer mantle surface of said bearing sleeves; and
said guide groove have open ends.

20. A hand-guided working tool comprising:
a telescopic rod having a first end and a second end;
a drive motor connected to said first end of said telescopic rod;
a working tool connected to said second end of said telescopic rod and driven by said drive motor;
said telescopic rod comprised of an outer tube and an inner tube inserted with an inner end into a first end of said outer tube and displaceable in a longitudinal direction of said telescopic rod;
a first clamping member connected to said first end of said outer tube for fixing an axial position of said inner tube;
said inner tube having an outer mantle surface and said outer tube having an inner circumferential surface;
said outer mantle surface being spaced at a radial distance (a) from said inner circumferential surface;
a first cylindrical bearing body supported on said inner end of said inner tube;
said first cylindrical bearing body displaceably supported in said outer tube;
said first clamping member having an inner circumferential guide surface matching said outer mantle surface of said inner tube such that said inner tube is secured coaxially relative to said outer tube by said first clamping member and said first cylindrical bearing body;

said outer tube having a second end opposite said first end;

a second clamping member connected to said second end of said outer tube;

a connecting tube inserted with a first end into said second end of said outer tube and having an outer mantle surface;

said second clamping member having an inner circumferential guide surface matching said outer mantle surface of said connecting tube;

a second cylindrical bearing body supported on said first end of said connecting tube and supported in said outer tube;

a first inner bearing positioned inside said first cylindrical bearing body;

a second inner bearing positioned inside said second cylindrical bearing body;

a telescopic drive shaft for drivingly connecting said drive motor to said working tool, said telescopic drive shaft rotatingly supported by said first and second inner bearings.

21. A working tool according to claim 20, wherein said first and second inner bearings are roller bearings.

22. A working tool according to claim 20, further comprising first and second rotary followers axially fixedly secured in an inner ring of said first and second inner bearings, wherein said telescopic drive shaft comprises a shaft rod extending through said first and second rotary followers.

23. A working tool according to claim 22, wherein said first and second rotary followers consist of plastic material.

* * * * *